Oct. 7, 1958  S. J. WALKER  2,855,073
RAILWAY TRUCK DISC BRAKE MOUNTING
Filed Oct. 20, 1955
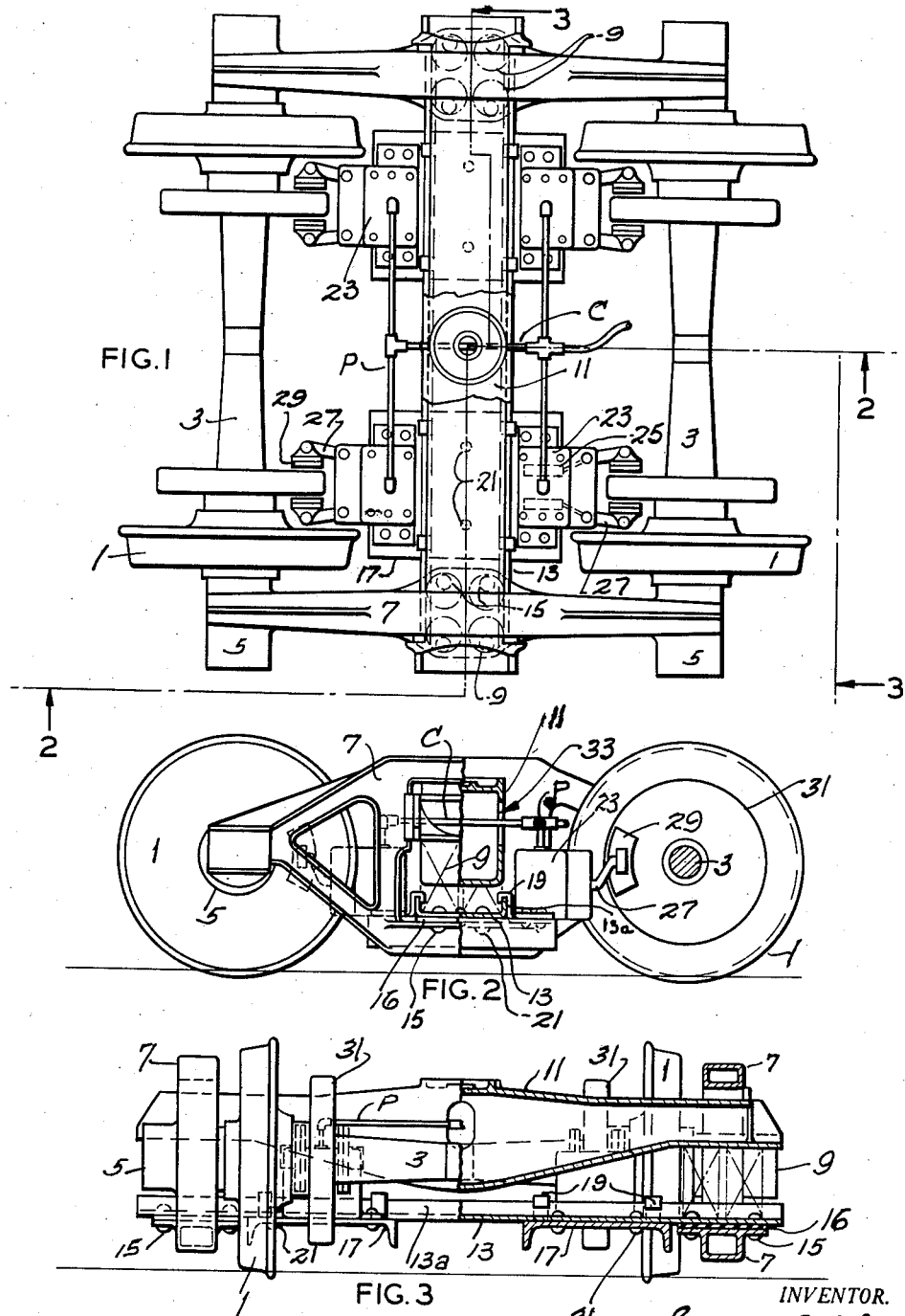
INVENTOR.
Samuel J. Walker
BY Rodney Bedell
atty.

United States Patent Office 2,855,073
Patented Oct. 7, 1958

2,855,073

RAILWAY TRUCK DISC BRAKE MOUNTING

Samuel J. Walker, Lake Forest, Ill., assignor to Chicago Railway Equipment Company, Chicago, Ill., a corporation of Illinois Application October 20, 1955, Serial No. 541,623

3 Claims. (Cl. 188—33)

The invention relates to railway vehicle truck structure and more particularly to the application of disc brakes, and the invention embodies the mounting of operating mechanism for the disc brakes upon a transverse framing member positioned at the middle of the truck and supporting brake gear independently of the spring-supported truck bolster. The brake carrying member may be a form of a spring plank supported near its ends on the truck side frames and mounting springs near its ends for supporting the usual bolster.

Among the objects of the invention are to avoid undesirable relative movement between the brake gear and the wheel and axle assemblies; to adapt disc type brake operating mechanism to a short wheel base truck; to simplify the truck side frames; and to avoid undue weight thereof due to the mounting of brake gear on separate beams or frames at opposite sides of the bolster and to avoid, or at least minimize, undesirable torque reactions to the braking forces on the truck frame and bolster.

In the accompanying drawings illustrating a selected embodiment of the invention:

Figure 1 is a top view of a railway vehicle four wheel truck provided with disc brakes, the operating mechanism of which is mounted upon a spring plank extending transversely of the truck between the truck side frame members.

Figure 2 is a side elevation and longitudinal vertical section on the line 2—2 of Figure 1.

Figure 3 is an end elevation and transverse vertical section on the line 3—3 of Figure 1.

The truck includes the usual wheels 1, axles 3, journal boxes 5, and side frames 7, which may be integral with the journal boxes or formed separately therefrom. The side frames are of diamond type with window openings in which are mounted the usual bolster springs 9. The bolster 11 extends transversely of the truck and projects through the side frame windows with its ends supported upon springs 9.

Extending transversely of the truck beneath bolster 11 is a beam-like spring plank 13 in the form of a channel with its flanges turned upwardly. The ends of the spring plank are properly anchored to the side frames at 15 at opposite sides of the transverse center line of the truck. Preferably a rubber pad 16 is inserted between each side frame and the spring plank to cushion shocks between these parts, but of insufficient thickness to afford substantial movement between the spring plank and the side frames.

Spaced inboard of the truck from each side frame 7 is a bracket 17 generally underlying the spring plank but preferably having struck out portions 19 extending upwardly, horizontally, and downwardly to overlie the upturned flanges 13a of the spring plank and thus afford a secure support of the brackets on the spring plank without relying upon the tension of securing rivets 21, which hold the brackets in position on the spring plank. Fluid cylinders 23, such as are commonly used in air brakes, are mounted upon the opposite ends of each bracket 17 and each cylinder is provided with at least one piston 25, levers 27, and shoes 29, the latter being arranged to operatively engage brake discs 31 mounted on the wheel and axle assemblies and spaced inboard of wheels 1.

The brake cylinders are shown connected by fluid piping P, including a conduit C extending lengthwise of the truck through an aperture 33 provided therefor in the side walls of bolster 11.

With this structure, the bolster is free to move vertically according to the action of springs 9, free of the weight of the brake gear and of torque reactions resulting from the application of the brakes.

The brakes are maintained at the same height relative to the brake discs and the torque reactions upon the application of the brakes are transmitted to the side frames near the middle of the latter and the upward thrust, resulting from the application of brakes to the forward pair of wheels, is substantially balanced by the downward thrust due to the application of the brakes to the trailing wheels, thus minimizing the tendency for "galloping" or tilting of the truck side frames in vertical longitudinal planes because of the application of the brakes.

The brake discs and the wheel and axle assemblies may be brought closer together than if the brakes were mounted directly upon the side frames or upon separate brake frames extending between the side frames. The bolster and side frames do not carry brake-mounting bracket structure, requiring relatively difficult molding or additional machining and assembly operations.

The drawings show the application of a pair of shoes to each of four discs adjacent to each wheel. A single shoe may be applied to each disc either inboard or outboard of the disc and if the braking forces required does not necessitate the application of brakes to four discs, a single disc on each assembly may be utilized.

Such variations in the number and arrangement of brake shoes are well-known expedients in the railway truck brake art.

The details of the structure may be varied substantially so far as the details are involved without departing from the spirit of the invention and the exclusive use of those modifications in the mounting of disc brakes on a truck spring plank and coming within the scope of the claims is contemplated.

What is claimed is:

1. In a railway truck having wheel and axle assemblies with journal boxes carried thereon and side frames supported from the journal boxes, the assemblies being provided with brake discs positioned inboard from the wheels and having opposite surfaces, a spring plank at the middle of the truck and extending laterally thereof, the opposite ends of said spring plank being secured to said side frames, spring means mounted adjacent the opposite ends of said spring plank, a bolster supported by said spring means and overlying said spring plank, brake assemblies supported by said spring plank forwardly and rearwardly thereof, each brake assembly including a pair of brake shoes engageable with opposite surfaces of each of said brake discs and fluid actuating operating means for said shoes, whereby the brake shoes are applied to each disc at the same distance from the disc axis.

2. A railway truck and brake structure as defined in claim 1, wherein the bolster is provided with a transverse opening and the fluid actuated operating means of said forward and rearward brake assemblies are connected by a fluid conduit extending through said opening and having clearance therewith for accommodating movement of the bolster relative to the spring plank and fluid actuated operating means supported therefrom.

3. In a railway truck having wheel and axle assemblies with journal boxes carried thereon and side frames supported from the journal boxes, the assemblies being provided with brake discs positioned inboard from the wheels and having opposite faces, a spring plank at the middle of the truck and extending laterally thereof, said spring plank having longitudinally extending upturned flanges formed thereon, the opposite ends of said spring plank being secured to said side frames, spring means mounted adjacent the opposite ends of said spring plank, a bolster supported by said spring means and overlying said spring plank, two spaced brackets secured to said spring plank and extending forwardly and rearwardly of said plank, each of said brackets having upwardly extending portions overlying said upturned flanges of the spring plank to securely support said brackets on the spring plank, each of said forwardly and rearwardly extending portions having brake assemblies supported thereon, each brake assembly including a pair of brake shoes engageable with opposite surfaces of each of said brake discs and fluid actuated operating means for said shoes, whereby the brake shoes are applied to each disc at the same distance from the disc axis.

References Cited in the file of this patent

UNITED STATES PATENTS

| 1,068,425 | Graham | July 29, 1913 |
| 2,465,823 | Tack | Mar. 29, 1949 |